Figure 1:
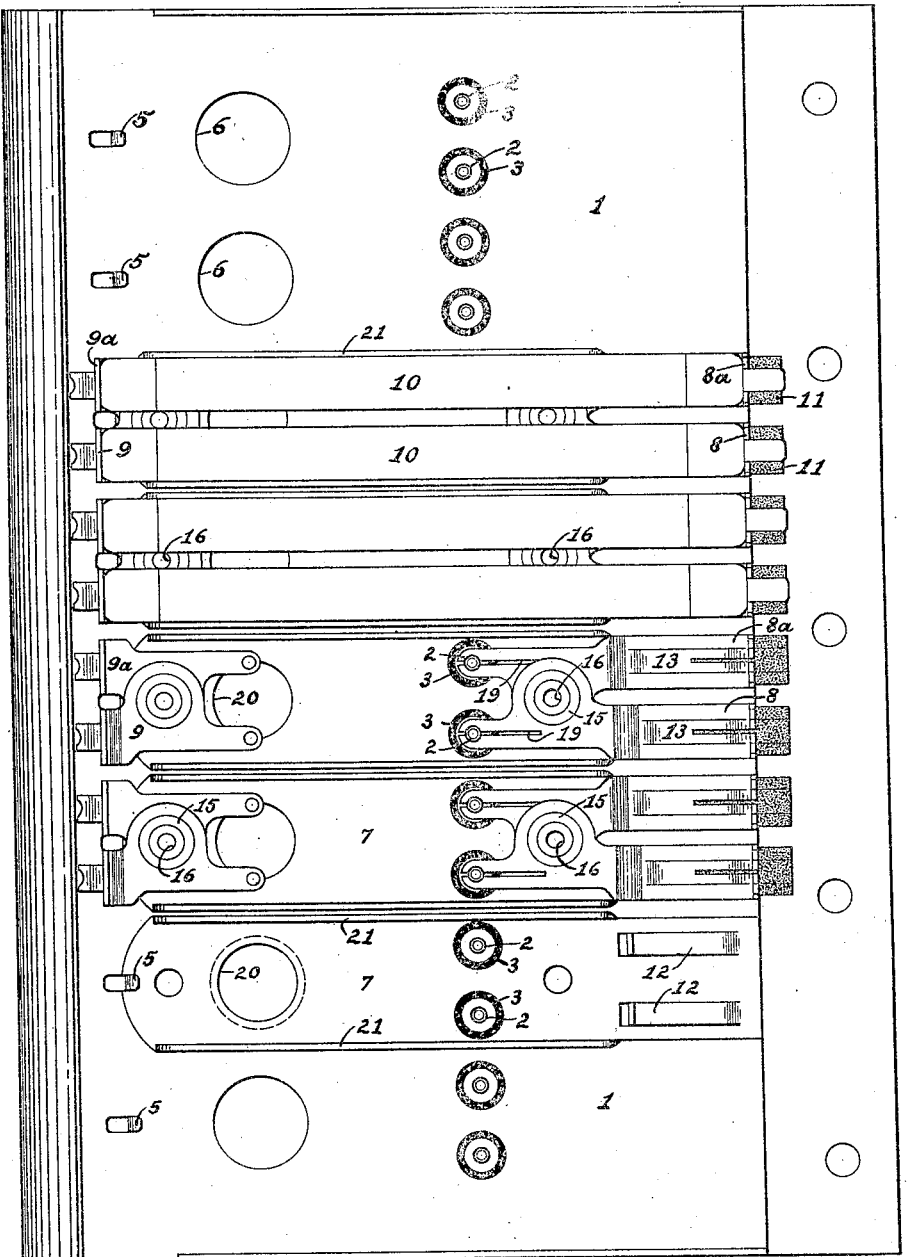

F. B. COOK.
INDIVIDUAL PROTECTOR UNIT AND MEANS FOR MOUNTING SAME.
APPLICATION FILED AUG. 2, 1909.

990,229.

Patented Apr. 25, 1911.
3 SHEETS—SHEET 1.

WITNESSES:
Maude J. Ball
Frances R. Parker.

INVENTOR:
FRANK B. COOK,
BY Frederick R. Parker.
ATTORNEY.

F. B. COOK.
INDIVIDUAL PROTECTOR UNIT AND MEANS FOR MOUNTING SAME.
APPLICATION FILED AUG. 2, 1909.
990,229.
Patented Apr. 25, 1911.
3 SHEETS—SHEET 2.
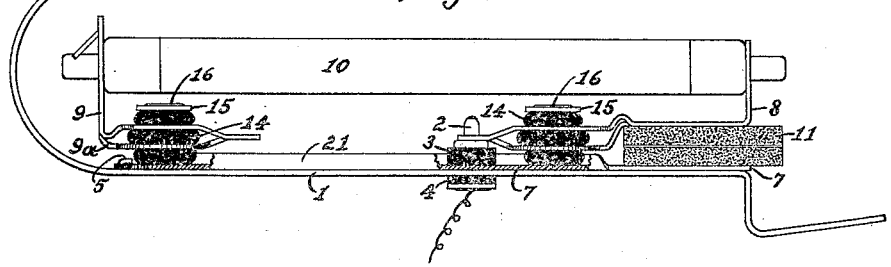
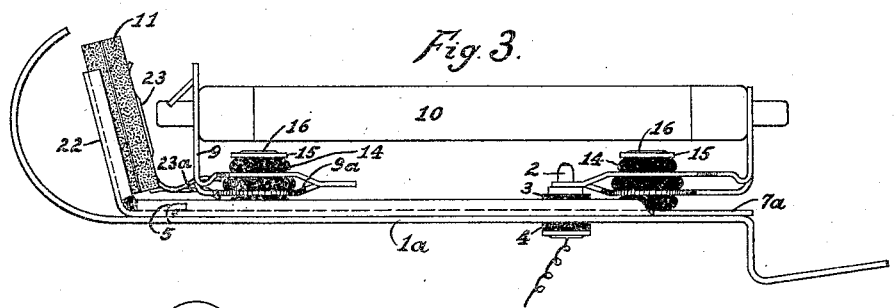
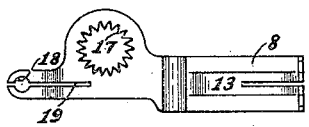
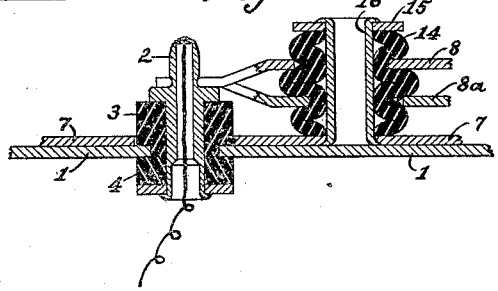
WITNESSES:
Maude J. Ball
Frances R. Parker.
INVENTOR:
FRANK B. COOK,
BY Frederick R. Parker
ATTORNEY.

F. B. COOK.
INDIVIDUAL PROTECTOR UNIT AND MEANS FOR MOUNTING SAME.
APPLICATION FILED AUG. 2, 1909.
990,229.
Patented Apr. 25, 1911.
3 SHEETS—SHEET 3.
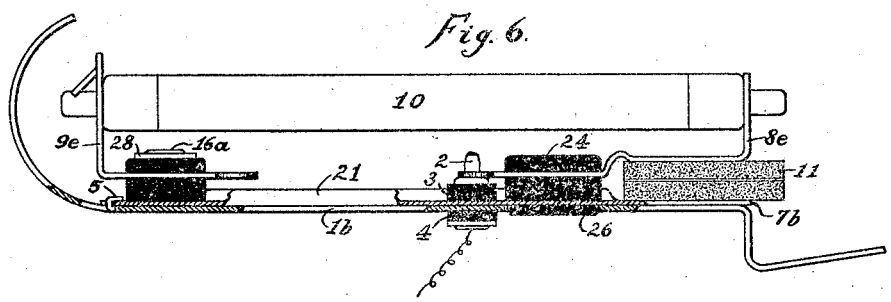
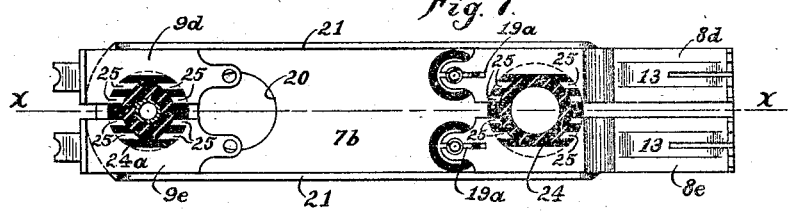
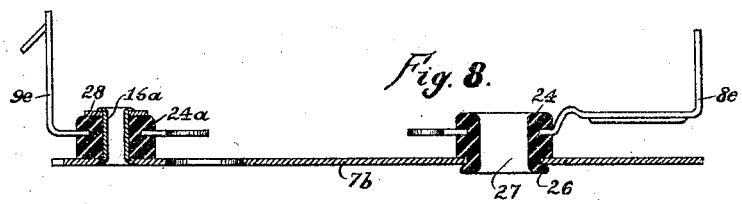
WITNESSES:
Maude J. Ball
Frances R. Parker
INVENTOR:
FRANK B. COOK,
BY Frederick R. Parker
ATTORNEY.

UNITED STATES PATENT OFFICE.

FRANK B. COOK, OF CHICAGO, ILLINOIS.

INDIVIDUAL-PROTECTOR UNIT AND MEANS FOR MOUNTING SAME.

990,229.  Specification of Letters Patent.  Patented Apr. 25, 1911.

Application filed August 2, 1909. Serial No. 510,870.

*To all whom it may concern:*

Be it known that I, FRANK B. COOK, a citizen of the United States of America, residing at Chicago, in the county of Cook and State of Illinois, have invented a new and useful Individual-Protector Unit and Means for Mounting Same, of which the following is a specification, reference being had to the accompanying drawings, illustrating same.

My invention relates to protectors for electrical conductors, and more in particular to individual protectors adapted to be mounted on strips or cable terminals.

The principal objects of my invention are to provide an improved individual protector unit as will be hereinafter more fully described; to provide improved means for mounting such an individual protector unit to a suitable base or support; to provide improved means for securely mounting the spring members of such a protector unit in place and insulating them from each other and from their mounting; and to provide simplicity of construction and cheapness of manufacture in such apparatus.

Other objects will be apparent from the following specification.

In the accompanying drawings illustrating the preferred forms of my invention, Figure 1 is an elevation of a sheet metal side portion of a cable terminal, showing several of one form of my improved individual protector units mounted thereon, and room to accommodate more of the said protector units, some of the parts being removed to show more clearly the details of construction; Fig. 2 is a plan view of the apparatus shown in Fig. 1, with portions removed to more clearly show the construction of such apparatus; Fig. 3 is a view of a modified form of individual protector unit and mounting plate therefor, taken the same as Fig. 2; Fig. 4 is a cross-sectional view of a portion of the apparatus shown in Figs. 2 and 3, showing in detail one method of mounting the several spring members of the protector unit in place, and the method of mounting the protector unit as a whole to its mounting plate; Fig. 5 is an elevation of one of the spring members used in the protector unit shown in Fig. 2, showing the detail of construction thereof; Fig. 6 is a view of another modified form of individual protector unit, taken the same as Fig. 2; Fig. 7 is a top view of Fig. 6, with portions removed to more clearly show the details of construction of the apparatus; and Fig. 8 is a cross-sectional view of part of the apparatus shown in Figs. 6 and 7, taken on plane $x$ $x$ of Fig. 7.

Like characters refer to like parts in the several figures.

In the drawings 1 is a sheet metal mounting plate for the individual protector units, preferably formed as shown so as to be used as one side of a cable terminal in a manner well understood. Of course it is to be understood that various plates or strips may be used for holding the individual protector units. The plate 1 carries a series of hollow binding posts 2 2 preferably constructed as shown in Fig. 4 and insulated from the plate 1 by suitable insulating portions 3 and 4. The plate 1 also has formed therein a series of hooks 5 5 adapted to hold the rear ends of the individual protector units in place as will be hereinafter more fully described. The plate 1 is also provided with a series of holes 6 6 therethrough for accommodating conductors leading from the rear spring members of the individual protector units.

Each of the individual protector units shown in Figs. 1 and 2, comprises a sheet metal base portion 7 carrying a pair of front spring members 8 $8^a$, a pair of rear spring members 9 $9^a$, a pair of inclosed fuses 10 10 suitably held in place by the spring members 8 9 and $8^a$ $9^a$ as shown, and a pair of lightning arresters 11 11 suitably mounted between front spring members 8 $8^a$ and the front edge of the plate 7. The plate 7 is preferably provided with a pair of tongue portions 12 12 formed therein, and the spring members 8 $8^a$ are preferably provided with depressions 13 13 therein, all for suitably holding the lightning arresters 11 11 in place.

The spring members 8 $8^a$ (and also 9 $9^a$) are mounted on the plate 7 as shown in detail in Fig. 4, which construction will now be described. This mounting is accomplished by first placing a straight rubber tube 14 and a washer 15 on a hollow metal tube 16, then placing the spring members 8 $8^a$ over the rubber tube 14 to the proper positions on same, then heating the rubber tube 14 until it is softened so that it may be readily compressed without breaking, then placing the lower end of the tube 16 through a hole in the plate 7, and then compressing the whole so as to bulge the rubber tube 14 out as shown in Fig. 4, and riveting the ends of the tube 16 over as shown, so that the parts are securely held in the position shown in Fig. 4 and are securely mounted on the base plate 7. Each of the spring members is notched as shown at 17 in Fig. 5, to prevent them from turning on the rubber portion 14. The inner ends of the spring members 8 $8^a$ are provided with holes 18 18 therethrough adapted to slip over the upper ends of the binding posts 2 2, and with split portions 19 19 extending from the holes 18 18 so as to cause the inner ends of the spring members 8 $8^a$ to rigidly clamp the binding posts 2 2 as shown. When the individual protector unit is mounted in place on the base plate 1 the notched rear end of the plate 7 is first hooked under one of the hooks 5 5, and then the forward end of the protector unit is pressed down toward the plate 1 until the inner ends of the spring members 8 $8^a$ firmly clamp the corresponding pair of binding posts 2 2 as shown, whereby the protector unit is firmly mounted in place. If it is desired to remove the protector unit, it is only necessary to pry the forward end of the unit from the plate 1 until the springs 8 $8^a$ are compelled to release their hold on the binding posts 2 2, whereupon the rearward end of the protector unit may be readily released from the corresponding hook 5 and the protector unit removed. Of course it will be readily seen that the spring members 8 $8^a$ make good electrical connections with the respective binding posts 2 2 of the pair.

Each of the base portions 7 7 of the protector units is provided with a hole 20 therethrough concentric with one of the holes 6 6 of the plate 1 when the protector unit is mounted on the plate 1, to accommodate electrical conductors leading from the inner ends of the spring 9 $9^a$ through the plates 7 and 1. The conductors leading to the binding posts 2 2, as from the interior of a cable terminal, are extended out through the posts 2 2 and secured to the outer ends of same by solder which tightly seals the openings in the posts 2 2.

If it is desired to mount the protector units of Figs. 1, 2 and 3 on a board or other suitable mounting, by means of bolts or screws, this can be done by simply placing the bolts or screws through the hollow metal tubes or rivets 16 16.

Each plate 7 is preferably formed with longitudinal side ribs 21 21 to give stiffness to the base portion of the protector unit.

In the individual protector unit shown in Fig. 3, the lightning arresters 11 11 are placed at the rear end of the unit in an upwardly-extending direction, instead of at the front end of the unit as shown in Figs. 1 and 2. In Fig. 3 the lightning arresters 11 11 are suitably held against the bent portion 22 of the plate $7^a$ by spring members 23 $23^a$ which are suitably secured to the spring members 9 $9^a$ as shown, preferably being soldered to these spring members 9 $9^a$.

It will be readily seen that each pair of spring members 8 $8^a$ or 9 $9^a$, is mounted to the plate 7 by a single hollow rivet 16, as shown in Fig. 1. This greatly simplifies the construction of such apparatus and provides a mounting which is very durable.

The individual protector unit shown in Figs. 6, 7 and 8, has the general appearance of the protector shown in Figs. 1 and 2, the principal difference between these two protectors being in the arrangement for, and method of, mounting the spring members to the base plate of the protector. In Figs. 6, 7 and 8, a hollow hard-rubber block 24 is provided for mounting the front pair of springs $8^d$ and $8^e$ to the base plate $7^b$. The block 24 is provided with an annular groove therearound, in which portions of the springs $8^d$ and $8^e$ are placed as shown, on opposite sides of the block 24. Each of the spring members $8^d$ and $8^e$ is cut away as shown in Fig. 7, so as to provide a plurality of slots and teeth thereon, the teeth 25 25 fitting into the annular groove in the block 24 preferably as shown. Now to firmly clamp the spring members $8^d$ and $8^e$ in place and mount them to the base plate $7^b$, the rubber block 24 is heated and is then compressed so as to tightly press it against both sides of the springs $8^d$ and $8^e$ and force the material of the rubber in between the teeth 25 25 so as to completely fill the openings between these teeth, the lower end 26 of the block 24 being at the same time formed over against the base plate $7^b$ as shown in Fig. 8 and thereby securely mounting the springs $8^d$ and $8^e$ and the block 24 to the base plate $7^b$. It will readily be seen that this construction mounts the springs $8^d$ and $8^e$ very rigidly to the rubber block 24, preventing the springs $8^d$ and $8^e$ from being turned on the block 24 and from being pulled laterally therefrom. It will also be seen that this mounting is accomplished by a single member 24, which firmly holds the parts together and suitably insulates the conductive portions from each other. The rubber block 24 is provided with a hole 27 therethrough for accommodating electrical conductors leading through the base plate $7^b$, if desired, the block 24 thoroughly insulating the said conductors from other conductive portions.

The mounting shown at the rear of the individual protector of Figs. 6, 7 and 8, is practically like the mounting last described above, except that in this case there is provided a hollow metallic member $16^a$ extending through the hard-rubber block $24^a$, and a washer 28 on top of the block $24^a$, the hollow metallic member 16ª being riveted over to the base plate 7ᵇ as shown, so as to compress the rubber block 24ª and thereby securely mount the springs 9ᵈ and 9ᵉ to the block 24ª, and also mount the whole to the base plate 7ᵇ. In this case there are also provided teeth 25 25 on the springs 9ᵈ and 9ᵉ, the rubber block 24ª being heated before the portion 16ª is riveted over, so that the material of the rubber block 24ª will be forced in between the teeth 25 25 by such riveting, as hereinbefore described.

When the individual protector shown in Figs. 6, 7 and 8 is mounted to a base portion 1ᵇ as shown in Fig. 6, the inner end 26 of the rubber block 24 extends through a suitable hole in the base portion 1ᵇ as shown, so as to suitably insulate any electrical conductors that may be extended through the opening 27 of the block 24, from the metal portion 1ᵇ.

With the individual protector units of this invention, a cable terminal may be constructed and installed on a cable without having any of the protectors, or spring members for holding the protectors in place, mounted thereon, and then after the cable terminal is installed, the individual protector units may be added to the cable terminal as it is desired to put the various pairs of conductors of the cable in service. With this arrangement the first cost of a cable terminal, especially a cable terminal of the inclosed-head type, is greatly reduced, it not being necessary to provide any of the protectors or the spring members for holding the protectors in place, until it is desired to actually use such protectors, and spring members on lines which are put in service. The advantages of such an arrangement can be readily seen.

I do not wish to limit this invention to all of the particular details herein set forth, as various modifications of same may be made without departing from the scope of the appended claims.

What I claim as my invention is:

1. In apparatus of the character described, a sheet metal mounting plate having a series of hooks thereon, a series of hollow binding posts carried by the said plate and suitably insulated therefrom, and a series of individual protector units each having a notched base plate adapted to engage the corresponding said hooks, each protector unit having a pair of bifurcated spring members adapted to engage and clamp the corresponding pair of said binding posts when the protector units are suitably positioned, whereby the protector units are removably and substantially mounted in place.

2. In apparatus of the character described comprising a sheet metal mounting base having a hook thereon, a pair of binding posts carried by the said base and insulated therefrom, and an individual protector unit having a base portion to be engaged by the said hook and a pair of bifurcated spring members adapted to engage and clamp the said binding posts when the protector unit is suitably positioned, whereby the latter is removably and substantially mounted in place.

3. In apparatus of the character described, a mounting base having a projecting hook thereon and binding posts carried thereby, and an individual protector unit having a base portion to be engaged by the said hook and bifurcated spring members adapted to engage and clamp the said posts when the protector unit is suitably positioned, whereby the latter is removably and substantially mounted in place.

4. The combination of a mounting base having a plurality of posts carried thereby, a protector unit having a base and a plurality of bifurcated spring members mounted thereon, and means whereby the said bases have removable engaging relation with each other near one end of the protector unit, the said spring members being adapted to engage and clamp the said posts when the protector unit is suitably positioned, whereby the latter is removably and securely clamped in place.

5. The combination of a mounting base having a post projecting therefrom, and a protector unit having spring fingers adapted to engage and clamp the said post when the protector unit is suitably positioned, whereby the latter is removably mounted in place.

6. A mounting of the character described comprising a suitable base, a hollow metallic tube extending through the said base, a hard-rubber portion and a washer threaded onto the said metallic tube, and spring members having projecting teeth thereon in engaging relation with the said rubber portion, the ends of the said metallic tube being riveted over against the said base and washer whereby the said rubber portion is compressed along the said metallic tube and forced in between the said teeth, and also pressed tightly against the said spring members on opposite sides thereof, whereby the latter are securely mounted on the said base and insulated therefrom and from each other, substantially as described.

7. A mounting of the character described comprising a base, a metallic tube extending through the base, a sleeve of insulating material placed over the metallic tube, and spring members having notched portions thereon in engaging relation with the said sleeve of insulating material, the said metallic tube being riveted over whereby the sleeve of insulating material is compressed against the said spring members and around the said notched portions, whereby the said spring members are suitably mounted on the said base and insulated therefrom and from each other.

8. A mounting of the character described comprising a base portion having a member extending therefrom, a sleeve of insulating material placed over the said member, and a terminal member engaging the said sleeve of insulating material medially therealong, the said sleeve of insulating material being compressed longitudinally and thereby caused to firmly engage the said terminal member on opposite sides thereof, whereby the latter is mounted on the said base portion and insulated therefrom.

9. A mounting of the character described comprising a base portion, a block of insulating material having an annular recess therein, and one or more terminal members having notched portions placed within the said annular recess, the said block of insulating material being compressed whereby the said recess is reduced and the material of the said block is formed tightly around the said notched portions for securely mounting the said terminal member or members to the said block, the said block extending through and being formed over against the said base portion, whereby it is securely mounted thereto.

10. A mounting of the character described comprising a base portion, a sleeve of insulating material inserted through the said base portion and having an annular recess therein, and one or more terminal members having notched portions thereon fitting in the said recess, the said sleeve of insulating material being compressed longitudinally whereby the material thereof is formed tightly around the said notched portions to securely mount the said terminal member or members to the said sleeve, and whereby the latter is riveted over against the said base portion to securely mount it thereto, the said sleeve serving to accommodate electrical conductors leading through the said base portion.

11. A mounting of the character described comprising a base portion, a block of insulating material having an annular recess therein, one or more terminal members having notched portions thereon placed within the said annular recess, and means for securely mounting the said block of insulating material to the said base portion, the said block of insulating material being compressed whereby the material thereof is forced tightly around the said notched portions to securely mount the said terminal member or members to the said block.

12. A mounting of the character described comprising a base portion, a sleeve of insulating material suitably mounted to the said base portion, and a terminal member or members mounted on the said sleeve of insulating material, the latter being compressed longitudinally whereby the material thereof is forced tightly against the said terminal member or members on opposite sides thereof to securely mount them on the said sleeve.

13. A mounting of the character described comprising a base portion, an insulating member carried by the base portion, and a terminal member or members associated with the said insulating member, the latter being compressed and thereby deformed whereby the material thereof is forced out tightly against the said terminal member or members on opposite sides thereof to securely hold them in place.

14. A mounting of the character described comprising a base portion, a hollow insulating member carried by the base portion, and a terminal member or members associated with the said insulating member, the latter being compressed and thereby deformed whereby the material thereof is forced out tightly against the said terminal member or members on opposite sides thereof to securely hold them in place.

15. An insulating member, and a terminal member or members associated with the said insulating member, the latter being compressed whereby the material thereof is forced outwardly against the said terminal member or members to securely hold them in place.

16. A hollow insulating member, and a terminal member or members associated with the said hollow insulating member, the latter being compressed whereby the material thereof is forced outwardly against the said terminal member or members to securely hold them in place.

17. A mounting of the character described, comprising a post, and spring fingers adapted to engage and clamp the said post when properly positioned, substantially as described.

18. The combination with a mounting base carrying a terminal member for an electrical conductor, of a separate individual protector unit comprising a protective device and a terminal therefor, the latter said terminal being adapted to engage the terminal member on the said base and thereby hold the said protector unit to the said base.

19. The combination with a cable terminal head carrying a terminal member for an electrical conductor, of a conductor attached to the said terminal member, and a separate individual protector unit comprising a protective device and a terminal therefor, the latter said terminal being adapted to engage the terminal member on the cable terminal head and thereby hold the said protector unit to the said head.

20. An insulating member, and a terminal member or members associated with the said insulating member, the latter being compressed and thereby deformed whereby the material thereof is forced tightly against opposite sides of the said terminal member or members to securely hold them in place.

21. A hollow insulating member, and a terminal member or members associated with the said hollow insulating member, the latter being compressed and thereby deformed whereby the material thereof is forced tightly against opposite sides of the said terminal member or members to securely hold them in place.

22. An insulating member, and a terminal member or members associated with the said insulating member and having one or more recesses or openings therein, the said insulating member being compressed whereby the material thereof is forced into the said recesses or openings to hold the said terminal member or members in place.

23. A hollow insulating member, and a terminal member or members associated with the said hollow insulating member and having one or more recesses or openings therein, the said insulating member being compressed whereby the material thereof is forced into the said recesses or openings to hold the said terminal member or members in place.

24. An insulating member, and a terminal member or members placed in close proximity to the said insulating member, the latter then being deformed so that the material thereof grasps the said terminal member or members to securely mount them to the said insulating member.

25. A hollow insulating member, and a terminal member or members placed in close proximity to the said insulating member, the latter then being deformed so that the material thereof grasps the said terminal member or members to securely mount them to the said hollow insulating member.

26. The combination with a mounting base carrying a pair of terminal members for electrical conductors, of a separate individual protector unit comprising a pair of protective devices and terminals therefor, the latter said terminals being adapted to engage the terminal members on the mounting base and thereby hold the said protector unit to the said base.

27. The combination with a cable terminal head carrying a pair of terminal members for electrical conductors, of a pair of conductors attached to the respective said terminal members, and a separate individual protector unit, comprising a pair of protective devices and terminals therefor, the latter said terminals being adapted to engage the terminal members on the cable terminal head and thereby hold the said protector unit to the said head.

28. In apparatus of the character described, a mounting base having a hook thereon and a terminal post carried thereby, and a protector unit having a base portion to be engaged with the said hook and spring fingers adapted to engage and clamp the said post when the protector unit is properly positioned, whereby the latter is removably and substantially mounted in place.

As inventor of the foregoing I hereunto subscribe my name, this 27th day of July, 1909.

FRANK B. COOK.

Witnesses:
FREDERICK R. PARKER,
MAUDE J. BALL.